United States Patent [19]

Russell

[11] 4,145,199

[45] * Mar. 20, 1979

[54] METHOD AND APPARATUS FOR FORMING KINKY FIBERS FROM HEAT-SOFTENABLE MATERIAL

[75] Inventor: Robert G. Russell, Granville, Ohio

[73] Assignee: Owens-Corning Fiberglas Corporation, Toledo, Ohio

[*] Notice: The portion of the term of this patent subsequent to Sep. 27, 1994, has been disclaimed.

[21] Appl. No.: 807,623

[22] Filed: Jun. 17, 1977

Related U.S. Application Data

[60] Division of Ser. No. 745,028, Nov. 26, 1976, Pat. No. 4,050,916, which is a continuation of Ser. No. 608,420, Aug. 28, 1975, abandoned, which is a continuation of Ser. No. 469,729, May 13, 1974, abandoned.

[51] Int. Cl.$^2$ ............................................. C03B 37/02
[52] U.S. Cl. ........................................ 65/2; 65/11 W; 65/12; 264/505; 264/168; 425/76; 425/378 S; 425/379 S
[58] Field of Search ........................... 65/2, 11 W, 12; 264/168, 88; 425/76, 378 S, 379 S

[56] References Cited

U.S. PATENT DOCUMENTS

| | | | |
|---|---|---|---|
| 1,923,183 | 8/1933 | Blum | 65/11 W X |
| 2,219,289 | 7/1942 | Slayter et al. | 65/11 W |
| 2,313,630 | 3/1943 | Dockerty | 65/11 W X |
| 2,377,810 | 6/1945 | Robbins | 264/168 |
| 2,509,845 | 5/1950 | Slayter | 65/11 W |
| 3,073,005 | 1/1963 | Tiede | 65/11 W X |

Primary Examiner—Robert L. Lindsay, Jr.
Attorney, Agent, or Firm—Ronald C. Hudgens; Harry O. Ernsberger; Greg Dziegielewski

[57] ABSTRACT

The disclosure embraces a method of and apparatus for processing heat-softenable materials, such as glass, to form fibers or filaments from streams of the material and particularly a method of and apparatus for effecting successive distortions, oscillations or vibrations of streams of the material at the region of formation or attenuation of the streams to fibers or filaments, and cooling or quenching the streams at the region of formation of the fibers or filaments for establishing successive kinks, bends or crimps in the attenuated fibers or filaments.

13 Claims, 25 Drawing Figures

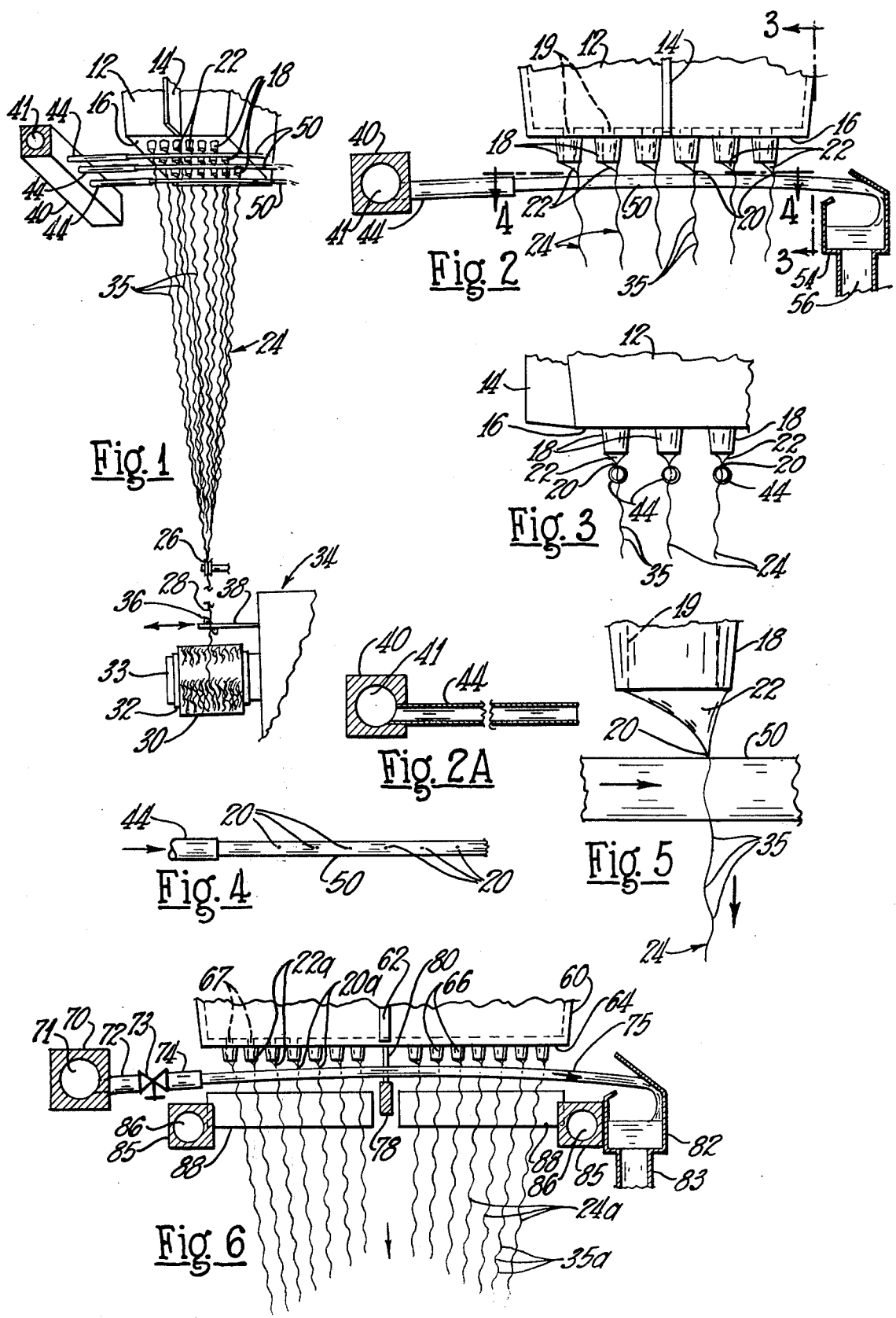

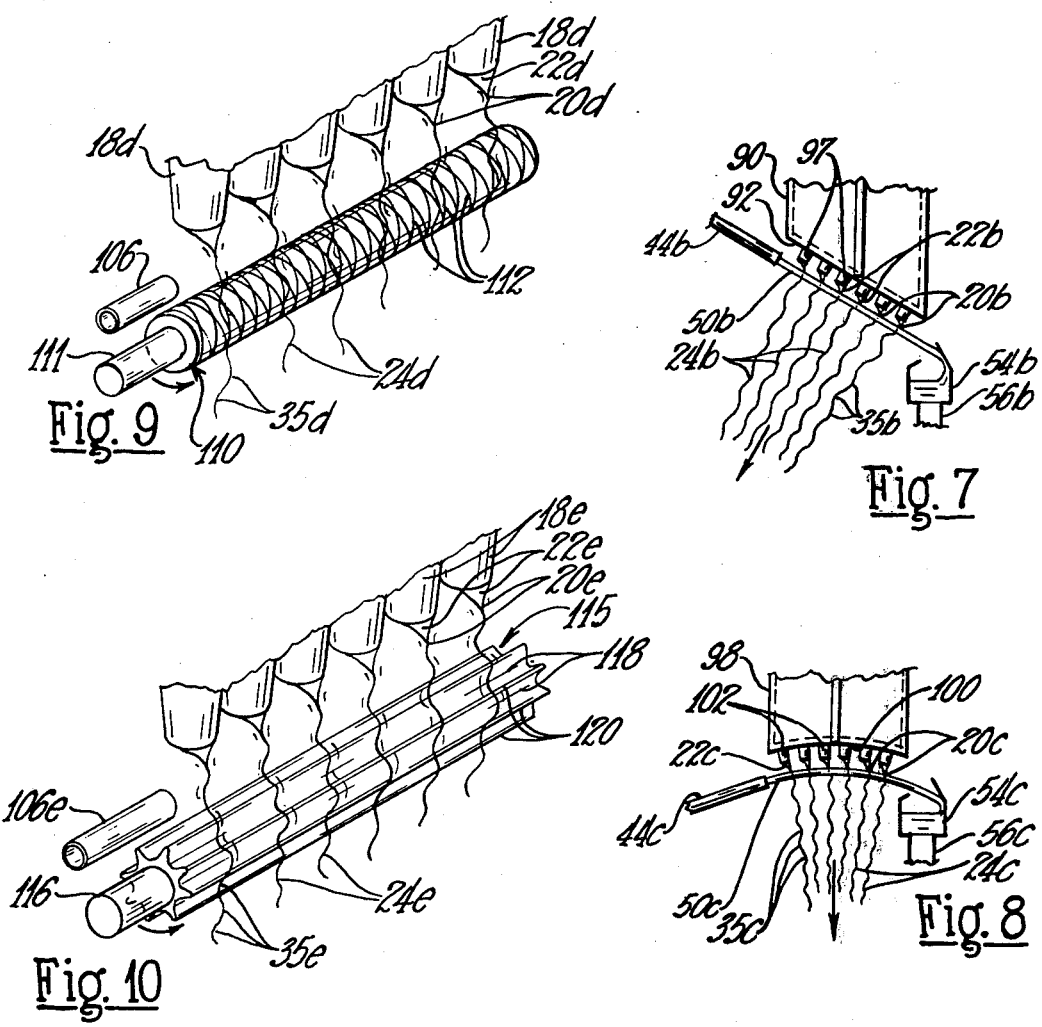

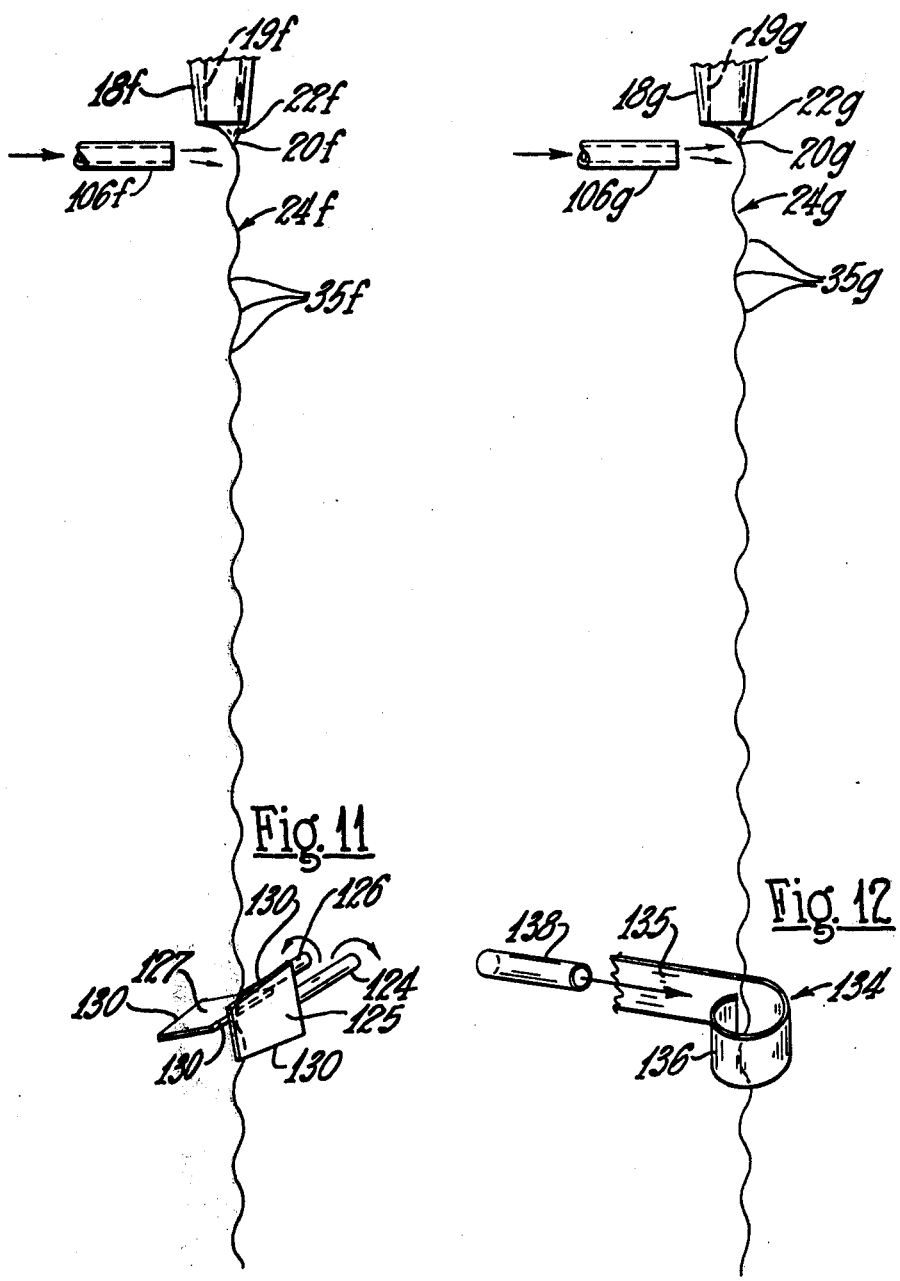

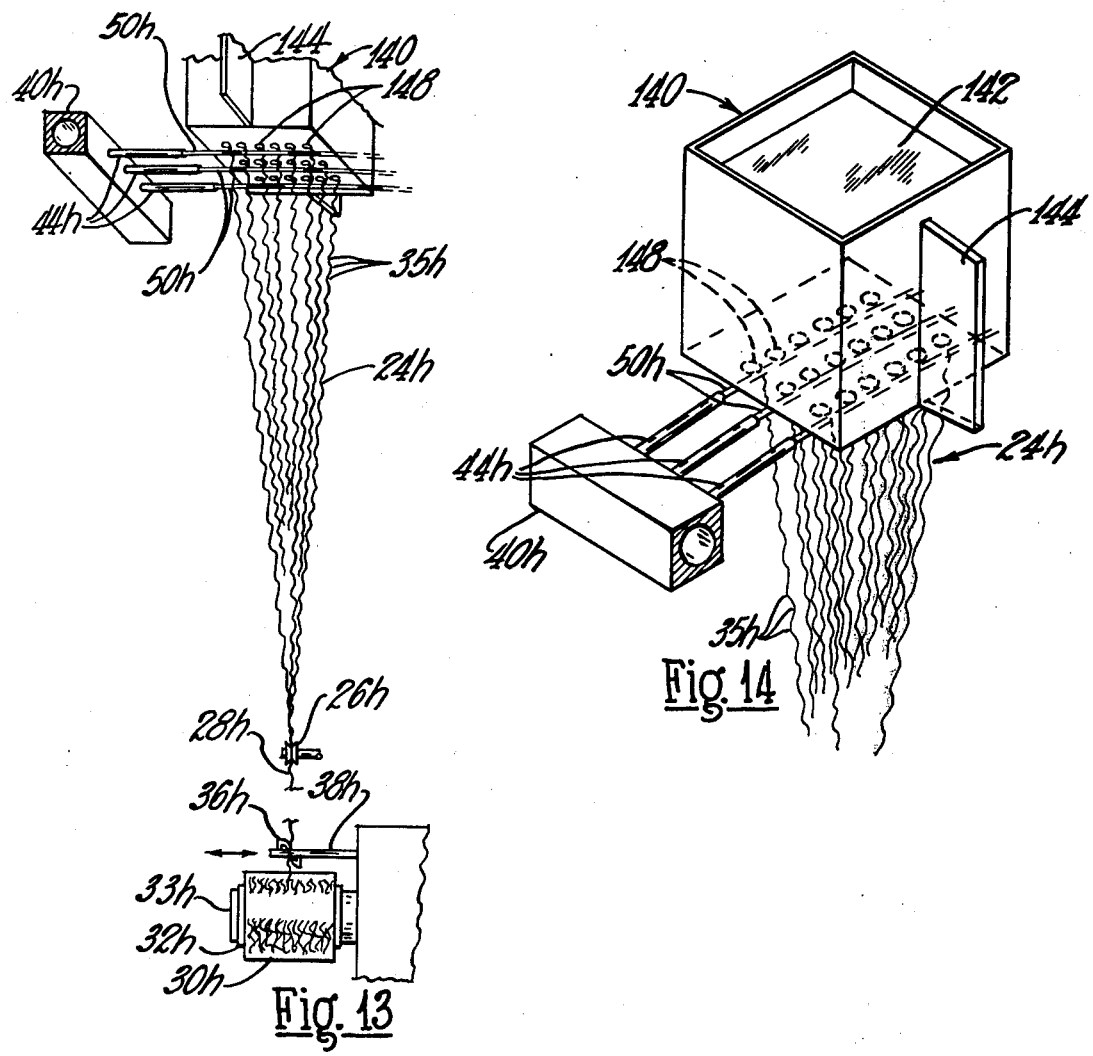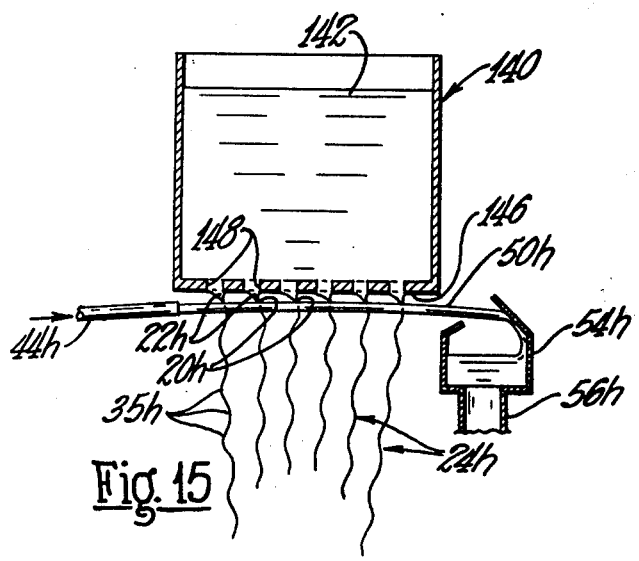

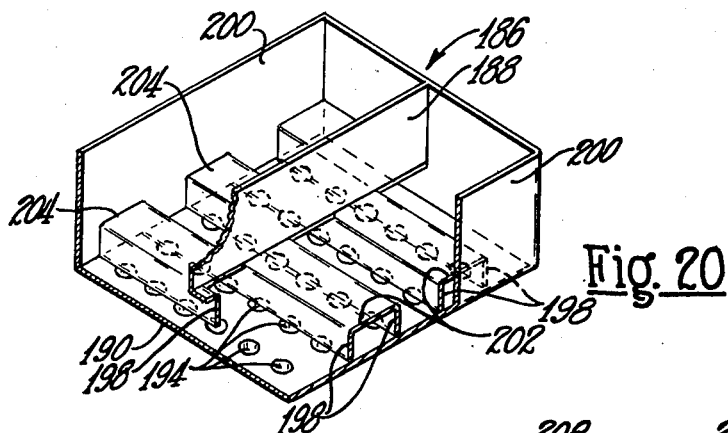
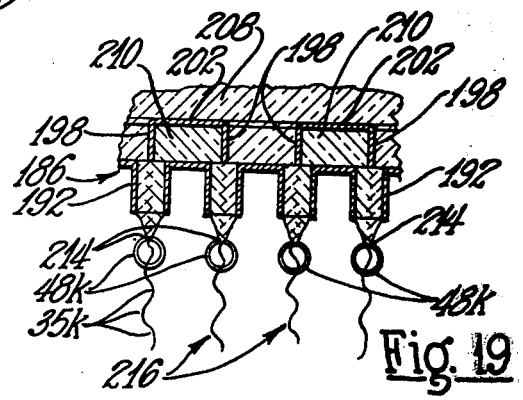
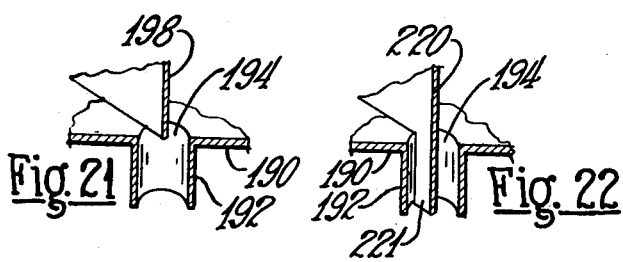
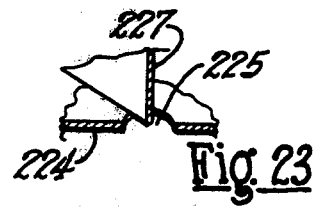
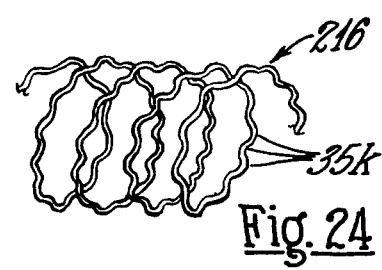

METHOD AND APPARATUS FOR FORMING KINKY FIBERS FROM HEAT-SOFTENABLE MATERIAL

This is a division of my copending application Ser. No. 745,028, filed Nov. 26, 1976, now U.S. Pat. No. 4,050,916 granted Sept. 27, 1977 which is a continuation of application Ser. No. 608,420, filed Aug. 28, 1975, now abandoned, which is a continuation of application Ser. No. 469,729, filed May 13, 1974, now abandoned.

The invention relates to a method of and apparatus for processing heat-softenable fiber-forming materials, such as glass, and more especially to the forming of fibers or filaments attenuated from glass streams with successive permanent kinks, bends or crimps in the attenuated fibers or filaments. It is desirable particularly in the textile field to provide glass fibers or filaments with successive kinks or bends but prior developments in this field have been unsuccessful.

The invention embraces a method involving flowing streams of heat-softened fiber-forming material from a supply, attenuating the streams to fibers or filaments, establishing successive distortions of the streams, and quenching the distorted regions forming permanent kinks or bends in the attenuated fibers or filaments.

The invention embraces a method of processing streams of heat-softened material, such as glass, wherein streams of the material flowed from a supply are formed or attenuated into fibers or filaments, and effecting vibrations, oscillations or successive distortions of the streams and concomitantly establishing temperature differentials in the streams during attenuation to form successive permanent kinks or bends in the fibers or filaments.

The invention embraces a method of forming fibers or filaments of heat-softened material, such as glass, having successive permanent kinks or bends in the fibers, the method including flowing streams of the material from a supply, applying forces to effect successive distortions of the softened material of the streams and rapidly cooling the distorted regions of the streams to solidify the distortions as successive kinks or bends in the fibers or filaments.

The invention embraces a method of processing streams of heat-softenable material, such as glass, wherein streams of the material flowed from a supply are attenuated into fibers or filaments, the method involving drawing the fibers or filaments as they are attenuated through a coherent stream of fluid at the attenuating region.

A further object of the invention resides in processing heat-softened fiber-forming material wherein streams of heat-softened material are flowed from a supply and attenuated to fibers or filaments, the streams of glass being engaged by a stream of fluid moving generally transversely of the direction of flow of the streams of heat-softened material, the stream of fluid effecting distortions, oscillations or vibrations of the softened material of the streams and quenching or cooling the streams of material forming successive bends or kinks in the fibers or filaments.

Another object of the invention resides in flowing streams of heat-softened fiber-forming material from a supply, attenuating the streams to fibers or filaments, vibrating or oscillating the fibers or filaments to effect distortion, vibration or oscillation of the streams, and subjecting the streams to a quenching environment at the region of the distortions, vibrations or oscillations of the streams permanently establishing successive kinks or bends in the attenuated fibers or filaments.

Another object of the invention resides in flowing streams of heat-softened fiber-forming material from a supply, attenuating the streams to fibers or filaments, applying forces to effect successive distortions of the streams, and delivering a fluid medium to the distorted regions to quench the distortions as permanent kinks or bends in the attenuated fibers or filaments.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIG. 1 is a schematic isometric view of an arrangement for attenuating streams of glass from a feeder to fibers or filaments and for establishing kinks or bends in the fibers or filaments being attenuated;

FIG. 2 is an elevational view illustrating the engagement of a stream of fluid with the streams of glass for forming kinks or bends in the fibers or filaments attenuated from the streams;

FIG. 2A is a longitudinal sectional view of a tubular nozzle for delivering a stream of fluid at the fiber-attenuating region;

FIG. 3 is a side view of the feeder illustrating the manner of engagement of the streams of fluid with the streams of glass;

FIG. 4 is a fragmentary sectional view taken substantially on the line 4—4 of FIG. 2;

FIG. 5 is an enlarged view illustrating a stream of fluid impinging a stream of heat-softened glass;

FIG. 6 is a sectional view showing a modified arrangement for forming kinks or bends in fibers or filaments attenuated from streams of glass;

FIG. 7 is a fragmentary schematic view illustrating a glass stream feeder having an angularly disposed stream flow region and means for directing a fluid against the glass streams for forming kinks or bends in the fibers or filaments attenuated from the glass streams;

FIG. 8 is a fragmentary schematic view illustrating streams of glass flowing from an arcuately-shaped feeder floor in association with a stream of fluid projected in an arcuate path impinging the glass streams to form kinks in the fibers or filaments attenuated from the glass streams;

FIG. 9 is an enlarged fragmentary view illustrating a form of means engaging attenuated fibers or filaments for vibrating the glass streams being attenuated to fibers or filaments in association with means for cooling the vibrated regions to the glass streams forming kinks or bends in the fibers or filaments;

FIG. 10 is an enlarged view illustrating another form of means for vibrating fibers or filaments to vibrate the streams of glass being attenuated to filaments in association with means for cooling the vibrated regions of the streams to form kinky fibers or filaments;

FIG. 11 illustrates another means for performing the method of vibrating or oscillating a glass stream being attenuated to a fiber or filament and directing a fluid into contact with the oscillating stream to form successive kinks or bends in the fibers or filaments;

FIG. 12 illustrates another form of means for performing the method of vibrating or oscillating a glass stream being attenuated to a fiber or filament and directing a fluid into contact with vibrating or oscillating stream to form permanent kinks or bends in the fiber or filament;

FIG. 13 is a schematic isometric view of an arrangement for flowing streams of glass from orifices in a feeder floor and processing the streams to establish kinks or bends in the fibers or filaments attenuated from the streams;

FIG. 14 is another isometric view of the arrangement shown in FIG. 13;

FIG. 15 is a sectional view of the arrangement shown in FIG. 14 illustrating a means for collecting the quenching fluid;

FIG. 19 is a fragmentary sectional view of a stream feeder construction for forming glass streams of glasses having different coefficients of expansion which are processed to form kinks or bends in fibers or filaments attenuated from the streams;

FIG. 20 is an isometric view of a portion of the stream feeder shown in FIG. 19 for forming the bi-glass streams;

FIG. 21 is an enlarged isometric sectional view of a stream feeder projection and partition means for forming a bi-glass stream;

FIG. 22 is an enlarged isometric sectional view illustrating a modified partition arrangement for forming a bi-glass stream;

FIG. 23 is an enlarged isometric sectional view illustrating an orificed stream feeder plate and partition means for forming a bi-glass stream, and FIG. 24 is an enlarged illustration of a curly fiber or filament with kinks or bends produced according to the invention, the view illustrating the fiber or filament in unrestrained or untensioned condition.

Figure 16:
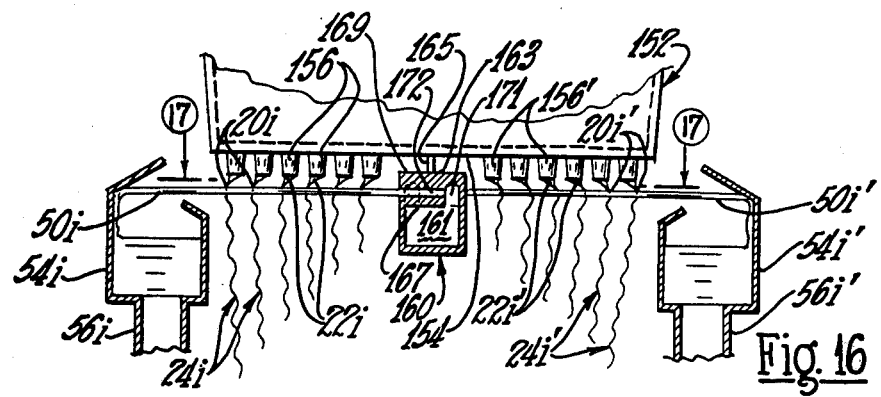
FIG. 16 is a semischematic sectional view illustrating a modified arrangement for processing streams of heat-softened material to form kinks or bends in fibers or filaments attenuated from the streams.

The method and apparatus of the invention are usable for processing heat-softenable fiber-forming materials and particularly glass to form attenuated fibers or filaments, the streams of heat-softened material being distorted, vibrated or oscillated and quenched or cooled concomitantly with attenuation to establish or form permanent kinks, bends or crimps in the attenuated fibers or filaments.

Referring to the drawings in detail and initially to FIG. 1, a form of apparatus is illustrated for processing heat-softened fiber-forming material, such as heat-softened glass, into fibers or filaments formed with successive permanent kinks, bends or crimps. The arrangement is inclusive of a stream feeder 12 adapted to contain heat-softened fiber-forming material. Where the fiber-forming material employed is glass, the stream feeder 12 is fashioned of a material, such as an alloy of platinum and rhodium or other material which is resistant to high temperatures of molten glass.

The end walls of the feeder 12 are provided with terminal lugs 14 connected with a supply of electric energy for heating the glass, one of the lugs being shown in FIGS. 1, 2 and 3. The stream feeder 12 may be connected with the forehearth of a glass melting furnace (not shown) and supplied with molten glass from the furnace, or the stream feeder or bushing 12 may be of a character which receives pieces or spherical bodies or prerefined glass reduced to a molten state by electrical energy passing through the stream feeder. The flow of electric energy through the feeder 12 is controlled to maintain the glass at a desired temperature and viscosity at which streams of glass of uniform characteristics may be flowed from the feeder.

The feeder floor 16 is preferably fashioned with rows of depending projections or tips 18 disposed transversely of the feeder, as shown in FIG. 1, each projection having a flow passage or orifice therein through which a stream 20 of the fiber-forming material or glass is flowed from the feeder. FIGS. 1 and 2 illustrate six orificed projections 18 in each transverse row and three orificed projections in each longitudinal row, but it is to be understood that there may be a larger number of depending projections in both the transverse and longitudinal rows.

Each glass stream at the region of exit from a projection or tip 18 is in the form of a cone 22. Each of the streams is attenuated to a fiber or continuous filament 24, the filaments or fibers 24 being converged by a member 26 into a linear group or strand 28. In the embodiment illustrated in FIG. 1, the strand 28 is wound into a package 30 on a collector tube 32 telescoped onto a collet or mandrel 33 of a winding machine 34, the mandrel and tube being rotated by a motor (not shown) in a conventional manner. The winding of the strand on the package attenuates the streams 20 to the fibers or filaments 24.

A rotatable traverse means 36 mounted on a bar 38 is reciprocable lengthwise of the collet 33. The rotatable traverse means 36 effects a crossing of the convolutions of strand in the package and the reciprocation of the bar 38 distributes the strand 28 lengthwise on the package in a conventional manner. Other methods or means may be employed for attenuating the streams to fibers or filaments such as a pull wheel arrangement of the character shown in Smock and Fulk U.S. Pat. No. 3,295,942.

The invention embraces a method of or means for effecting or establishing distortions, vibrations, oscillations, relative lateral movements, displacements or non-rectilinear configurations of the softened glass of the streams at or adjacent the tip regions of the cones 22 of glass and impinging a stream or jet of fluid against the glass streams at the tip regions of the cones in a manner to establish cooling or quenching of the streams of glass forming successive kinks, bends or undulations 35 in the filaments.

One embodiment of such means is illustrated in FIGS. 1 through 5. Disposed lengthwise of the stream feeder 12 is a manifold or member 40 having a hollow interior 41 which is supplied with a quenching fluid, such as water under pressure. Disposed lengthwise of the manifold 40 in spaced relation are tubes, pipes or tubular nozzles 44 joined with the manifold 40. FIG. 2A is a longitudinal sectional view of the tube, pipe or tubular nozzle 44, the tubular nozzle 44 being of circular cylindrical cross section of substantially uniform diameter throughout its length.

As shown in FIG. 3, each of the pipes 44 is aligned with a transverse row of glass streams 20. While FIGS. 1 and 2 illustrate six orificed projections 18, each having an orifice 19 flowing a glass stream, the stream feeder may be provided with a larger number of transverse rows of orificed projections with twelve or more projections in each transverse row and upwards of fifteen or more rows.

The manifold 40 is connected with a supply of fluid, the manifold conveying the fluid to each of the pipes or tubular nozzles 44. The fluid in the manifold 40 is under pressure and the fluid is projected as a coherent stream 50 from each of the tubes 44. Water is preferred as a quenching fluid for the streams of glass but other suitable fluids may be used. Under certain operating conditions of the method as hereinafter described, the fibers or filaments attenuated from the glass streams may be vibrated or oscillated and the glass streams quenched by fluids such as air or other gases to form kinks or bends 35 in the fibers or filaments.

Arranged adjacent the opposite side region of the feeder 12 is a trough or receptacle 54 disposed lengthwise of the feeder 12 and positioned to receive and convey away the fluid after it has engaged the glass streams of a transverse row of streams. The receptacle or trough 54 is provided with an outlet pipe 56 which may be connected to a pump (not shown) for recirculating the fluid through the manifold 40 for reuse in the quenching operation.

It is desirable that the streams of water 50 or other quenching fluid be of sufficient velocity so that the streams 50 of the water impinge against the streams 20 of glass adjacent the tips of the cones 22 to distort, vibrate or oscillate the glass streams as shown in FIGS. 2 and 5 from their otherwise normal vertical paths of descent from the axes of the passageways or orifices 19. It is found that the size or diameter of the stream of water, where water is used as the quenching fluid, must be adequate to impinge against all of the glass streams of a row.

A coherent stream of quenching fluid, such as water, projected from a tube, pipe or tubular nozzle 44 of about one-eighth of an inch internal diameter and of a length of about five or six inches has been found to be satisfactory in engaging all of the glass streams of a row with the water being under proper pressure. It is found that water under pressure of from thirty pounds per square inch to about sixty pounds per square inch will provide an eighth inch diameter stream of water with sufficient velocity to engage the glass streams of a row and that the stream 50 of water has substantially a rectilinear coherent trajectory with a minimum of curvature as illustrated in FIG. 2.

It is found that a coherent or concentrated stream of fluid, such as water, delivered from the tubular nozzle 44 under sufficient pressure may be impinged against at least fourteen streams of glass in a row and satisfactorily quench all of the glass streams. If the water pressure providing the quenching stream 50 is too high, then the velocity impact of the water of the stream against the glass streams at the attenuating region tends to tear or break the glass streams and glass beads tend to form. The streams of glass 20 of a row are aligned whereby the fibers as they are attenuated are drawn through the central region of the stream 50 of fluid as illustrated in FIGS. 3 and 4.

In the method of operation of the arrangement shown in FIGS. 1 through 5, the attenuated fibers or filaments 24 are converged by a member or gathering shoe 26 into a linear group or strand 28 and the strand wound into a package on a rotating forming tube 32 mounted upon a motor driven mandrel 33 of the winder 34. The traverse member 36 mounted on the bar 38 is rotated and reciprocated in a manner conventional in glass textile winding machines. The traverse or guide 36 is preferably of a type for effecting a crossing of the individual convolutions of strand 28 as the strand is wound into the package 30 to facilitate withdrawing the strand from the package without breakage of the strand. If it is desired to wind the strand 28 into a package without effecting a crossing of the convolutions of strand, a nonrotatable conventional strand guide may be mounted on the reciprocating bar 38 in lieu of the rotatable guide 36.

After the initiation of the flow of the streams of glass from the orificed projections 18 of the feeder by rotation of the forming tube 32, the coherent streams of quenching fluid 50, such as water, are projected from the tubes 44 and the water of the streams impinged against the rows of glass streams 20. The streams of water impinging the glass streams at or adjacent the tips of the cones 22 of glass distort the cones 22 of glass and the glass streams.

FIG. 5 is a greatly enlarged view and purports to illustrate the formation of kinks or bends 35 in a fiber or filament 24 being attenuated from the tip region 20 of the cone of glass 22. The stream 50 of fluid, such as water, moving in the direction of the arrow substantially normal to the general direction of movement of the fiber or filament being attenuated, impinges against the glass stream, the fiber or filament as it is attenuated being drawn through the stream 50 of fluid.

While the action of the streams of quenching fluid on the glass streams may not be fully understood, it is believed that the forces of the quenching medium or fluid cause substantially continuous distortions, oscillations, vibrations or lateral movements of the glass stream adjacent the tip of the cone 22, the glass stream however being maintained within the quenching stream under the influence of the tension of advancing the fiber or filament 24 by winding the same with other fibers or filaments of a linear group or strand 28 into a wound package or by other attenuating means, It is believed that the distortion, oscillation or vibration of the glass stream includes a torque or twist of the region of the glass stream engaged by the stream of quenching fluid. The twisting or torsion of the glass stream is believed to occur rapidly in alternate, generally lateral directions within the quenching stream by reason of an imbalance of forces of the quenching stream acting on the mobile or distortable glass of the glass stream concomitantly with the cooling or quenching action of the quenching fluid stream.

It is believed that concomitantly with the twisting or torsion of the glass stream by the forces of the quenching or cooling fluid stream, a thermal differential in the cooling or quenching of the glass stream is occurring at the surface region or side of the twisting glass stream being impinged by the quenching fluid which region or side is first chilled or quenched and its temperature reduced below the temperature of the opposite side region of the twisting glass stream. As the glass stream and the fiber or filament being formed are being rapidly alternately twisted or rotated in different directions under the influence of the forces of the quenching fluid stream, the region of each glass stream subjected to direct impingement by the quenching stream is being shifted or changed.

It is believed that the distortion, oscillation or vibration may occur as a twisting, torsion, lateral displacement or movement of the glass stream, and the concomitant quenching of a shifting surface region of the glass stream being directly impinged by the quenching fluid solidifies the successive distortions, oscillations or vibrations as permanent bends, kinks or undulations in the attenuated fiber or filament.

The forces acting to distort or effect a torque of the stream of glass are rapidly alternately operative to produce the successive permanent kinks, bends or undulations in the attenuated fiber or filament which are closely spaced and disposed substantially uniform distances apart in the fiber or filament.

The uniform spacing of the kinks or bends in the fiber or filament indicates that the distortion, oscillation, vibration or undulation is occurring at a substantially constant frequency. The higher the rate of frequency of distortion, oscillation, vibration or undulation of the softened glass of the glass stream at or adjacent the quenching region, the closer the kinks or bends 35 formed in the filaments. It is found that the spacing of kinks or bends in the fibers or filaments may vary with different glass compositions.

The coefficient of expansion of a glass has an effect upon the acuteness, sharpness or amplitude of the bends or kinks 35 formed in the fibers or filaments 24. A glass having a comparatively high coefficient of expansion will have more acute or sharper bends or kinks than the kinks or bends formed in fibers or filaments of a glass having a lower coefficient of expansion.

The kinky fibers or filaments formed of glasses of different coefficients of expansion have different characteristics of hand or "feel". Kinky fibers or filaments formed of a glass composition of a comparatively high coefficient of expansion have an improved "feel" in a mass, that is, are quite fluffy as compared with the "feel" or less fluffiness of a mass of kinky fibers or filaments formed of a glass having a lower coefficient of expansion.

During an attenuating and quenching operation in forming fibers or filaments having successive kinks or bends therein, where the filaments are under tension by winding a strand or linear group of the filaments into a wound package or by advancing the filaments by pull wheels or other means, the kinks or bends 35 permanently formed in the attenuated filaments are not visible to the eye by reason of the tension of attenuation in the fibers or filaments straightening out the kinks or bends 35. When the filaments are relaxed or not under tension, the kinks or bends 35 are distinctively visible and such kinky fibers or filaments in a mass formation have the "feel" or characteristic similar to the "feel" or characteristic of a mass of cotton fibers.

FIG. 6 illustrates a modification of the arrangement shown in FIGS. 1 through 3. In this form a stream feeder 60 is adapted to contain heat-softened fiber-forming material, such as glass, the feeder 60 being fashioned of high temperature resistant material such as an alloy of platinum and rhodium. The feeder 60 is provided at its ends with terminal lugs 62, one of which is shown in FIG. 6, for connection with a supply of electric energy for electrically heating the material in the feeder to maintain the heat-softened material at a substantially constant viscosity.

The stream feeder 60 may be connected with a forehearth of a glass melting furnace (not shown) to receive molten glass from the forehearth channel, or the stream feeder may be of a character which receives pieces or marbles of prerefined glass which are melted by electric energy flowing through the feeder. The feeder floor 64 is fashioned with transverse rows of depending tips or projections 66, one of the rows being illustrated in FIG. 6.

Each of the depending projections 66 is provided with a flow passage or orifice 67 through which a stream 20a of glass is flowed from the feeder. Each glass stream at the terminal region of a projection 66 is in the form of a cone 22a. Each of the streams 20 is attenuated to a continuous fiber or filament 24a, the fibers or filaments being converged into a linear group or strand (not shown) in the manner illustrated in FIG. 1, the fibers or filaments being attenuated by winding the strand on a rotating packaging tube or by engaging the strand with a pull wheel arrangement as hereinbefore mentioned.

FIG. 6 illustrates a means or arrangement for impinging a stream of quenching fluid, such as water, against the glass streams adjacent the tips of the cones 22a of glass to cool or quench the glass streams concomitantly with their attenuation into fibers or filaments to form successive kinks or bends 35a in the fibers or filaments. Disposed lengthwise of the feeder 60 and spaced from one side of the feeder is a manifold 70 having a hollow interior or chamber 71 which is supplied with quenching fluid such as water under pressure.

Disposed lengthwise of the manifold 70 in spaced relation are tubes or pipes 72, one of which is shown in FIG. 6. If desired, each pipe 72 may be provided with a fluid regulating or metering means 73 which is connected a fluid discharge tube or nozzle construction 74. The fluid regulating means may be an adjustable valve, as shown schematically in FIG. 6, or may be a fixed flow restrictor or bushing. A stream 75 of quenching fluid is projected from the tube or nozzle 74 of a velocity sufficient to impinge each of the streams of glass of a transverse row of streams of glass.

The manifold 70 is equipped with a number of fluid delivery pipes and flow regulating means equal to the number of transverse rows of glass streams delivered from rows of orificed projections 66 depending from the feeder floor 64 whereby a stream 75 of quenching fluid is impinged against the glass streams in each row. The manifold 70 is connected with a supply of fluid, such as water, under substantially constant pressure so that the characteristics of the quenching streams of fluid may be maintained substantially constant to assure substantially uniform quenching of all of the glass streams flowing from the stream feeder.

The stream feeder 60 is of substantial width so as to accommodate transverse rows of depending orificed projections with a substantial number of projections 66 in aligned relation in each row. As shown in FIG. 6, there are fourteen orificed projections 66 in a transverse row with seven projections at each side of the central region of the feeder floor. It is to be understood that the stream feeder may be of a width to accommodate more than fourteen projections 66 in each transverse row.

In a feeder construction such as a feeder formed of an alloy of platinum and rhodium, there is a tendency for the central region of the feeder floor to sag by reason of the high temperature of the glass. As illustrated in FIG. 6, there is disposed beneath the central region of the feeder 60 a support means or bar 78 extending lengthwise of the stream feeder and mounted by means (not shown). Mounted on the bar 78 are posts or struts 80 having their upper ends engaging and supporting the central region of the feeder floor 64, the struts 80 being spaced lengthwise of the bar 78 to accommodate the streams 75 of quenching fluid.

Disposed adjacent the side region of the feeder 60 opposite the side adjacent the manifold 70 is a trough or receptacle 82 disposed lengthwise of the feeder 60 and adapted to receive the water of the quenching streams after the glass streams have been engaged by the streams of water. The trough or receptacle 82 is provided with an outlet pipe 83 for conveying away the water collected in the trough 82. Where is it desired to recirculate the water, the pipe 83 may be connected with a pump (not shown) for redelivery of the water under pressure to the manifold 70 for reuse in the quenching operation.

Where water or other liquid is used as a quenching or cooling fluid, the liquid should be under sufficient pressure to engage all of the glass streams of a row with a minimum curvature of the water stream so as to effect substantially uniform quenching of the glass streams to form kinks or bends 35a in the fibers or filaments 24a. The quenching liquid under excessive high pressure may not be used because the force of impingement of the water at high velocity against the glass streams tends to tear or sever the streams from the cones of glass. The exuded glass would then form beads or droplets and thus impair attenuation.

In attenuating fine textile filaments or fibers from glass streams utilizing certain glass compositions, it is desirable to maintain the glass at the stream flow region of the feeder at a comparatively low viscosity which may be too low for satisfactory attenuation. In the use of such glass compositions, it is usual to employ heat transfer members in the form of fins or fin shields to transfer heat away from the glass streams to render the streams more stable and to maintain the streams at a viscosity sufficiently high for satisfactory attenuation.

A heat-transfer member or fin shield arrangement of this character is shown in my U.S. Pat. No. 2,908,036. As shown in FIG. 6, there is disposed adjacent each side region of the glass stream feeder a header or manifold 85 having an interior channel 86. Secured to each of the manifolds 85 is a plurality of metal heat-transfer members comprising blade-like fins or fin shields 88, each of the fin shields extending substantially one-half way across the width of the glass stream feeder between a pair of rows of the depending orificed projections 66, the inner ends of the shield members 88 terminating at a region short of the feeder support member 78.

Each adjacent pair of fin shields has two rows of orificed projections 66 aligned therebetween. For purposes of illustration, in FIG. 6, the fin shield and header arrangement is shown spaced a substantial distance below the glass stream feeder 60, but it is to be understood that the members or fin shields 88 are disposed close to the rows of depending projections 66 in the manner illustrated in my U.S. Pat. No. 2,908,036 to effectively transfer heat away from the glass streams at the regions of the cones 22a in order to maintain the glass at a viscosity suitable for attenuation.

Water or other coolant is circulated through the headers or manifolds 85 at a controlled rate of flow and at a predetermined temperature to establish desired temperature differentials between the fin shield members 88 and the glass flowing from the depending orificed projections 66. The fin shields 88 are spaced between the rows of glass streams and hence do not impair the quenching fluid streams 75 as the latter are aligned with and impinge the glass streams.

In the arrangement illustrated in FIG. 6 the glass streams are distorted, vibrated or oscillated and are cooled or quenched in the manner hereinbefore described to form successive kinks or bends 35a in the fibers or filaments 24a.

FIG. 7 illustrates a modified form of glass stream feeder in association with means for quenching the glass streams to form kinks or bends 35b in the fibers or filaments attenuated from the glass streams. The glass stream feeder 90 is configured with a floor 92 arranged at an acute angle of about thirty degrees with respect to a horizontal plane as illustrated in FIG. 7, but the floor 92 may be at any angle up to about forty-five degrees from a horizontal plane.

The feeder floor is provided with orificed projections 94 through which flow streams 20f of heat-softened glass contained in the feeder or bushing 90, the regions of the glass streams 20b at the ends of the projections 94 being in the form of cones 22b. The fibers or filaments 24b are attenuated by a strand of the fibers or filaments 24b being wound into a package on a rotating mandrel of a winding machine or by other attenuating means, the direction of linear advancement or movement of the fibers or filaments 24b being preferably in a general direction normal to the plane of the feeder floor 92.

Disposed adjacent the floor 92 at the left-hand thereof is a tubular member, pipe or nozzle 44b connected with a manifold, such as the manifold 40 shown in FIGS. 1 and 2. The axis of the tubular nozzle 44b is aligned with a transverse row of glass streams 20b. A quenching fluid, such as water under pressure contained in the manifold, is projected from the tubular member or nozzle 44b as a stream 50b impinging the glass streams for distorting the glass streams and quenching or cooling the glass streams during their attenuation to form kinks or bends 35b in the fibers or filaments as herinbefore described.

Arranged at the lower right-hand region of the feeder floor 92 is a trough or receptacle 54b disposed lengthwise of the feeder 90 to receive the quenching fluid after the fluid has engaged or impinged the glass streams of a transverse row of glass streams. The receptacle or trough 54b has an outlet pipe 56b for conveying away the fluid, or conveying the fluid to a pump (not shown) for recirculating the fluid to the tubular members 44b and 48b for reuse in quenching the glass streams.

It is to be understood that while a single row of glass streams and a single stream of quenching fluid are illustrated in FIG. 7, the feeder 90 may be provided with many transverse rows of orificed projections for feeding streams of glass as illustrated in FIG. 1 and a quenching fluid stream provided for each transverse row of the glass streams 20b flowing from the stream feeder 90.

If desired, the tubular members or nozzles 44b and the manifold (not shown) may be disposed at the lower right-hand region of the feeder 90 and the quenching stream 50 directed upwardly at an angle, the axis of the quenching stream being substantially parallel with the plane of the feeder floor 92. In such arrangement the trough or fluid collecting receptacle 54b would be disposed adjacent and below the left-hand side wall of the bushing 90.

FIG. 8 illustrates a modified arrangement for flowing streams of glass from a feeder and processing the glass streams to form kinks or bends 35c in fibers or filaments attenuated from the glass streams. In this form, the glass stream feeder 98 is fashioned with a floor or floor section 100 of curved or concave arcuate configuration or partial cylindrical shape widthwise or transversely of the feeder as shown in FIG. 8.

The feeder floor 100 is provided with transverse rows of depending orificed projections 102 through which flow streams 20c of heat-softened glass contained in the feeder 98, the cones 22c of the glass streams depending from the orificed projections 102. The glass streams 20c are attenuated into fibers or filaments 24c by winding a group or strand of the fibers or filaments into a package on a rotating mandrel of a winding machine as illustrated in FIG. 1 or by a pull wheel or pull wheels or other attenuating means.

Disposed at the left-hand region of the feeder 90 is a tubular member or nozzle 44c connected with a manifold (not shown) such as the manifold 40 shown in FIGS 1 and 2. The axis of the tubular member 44c is aligned with the transverse row of glass streams 20c. A quenching fluid, such as water under pressure, contained in the manifold is projected from the tubular member or nozzle 44c as a stream 50c impinging the glass streams for distorting the glass streams and quenching or cooling the glass during attenuation forming kinks or bends in the fibers or filaments as hereinbefore described.

In the arrangement illustrated in FIG. 8, the pressure of the fluid may be varied to control the trajectory of the projected quenching stream 50c in an arcuate configuration or curvature in substantial parallelism with the curvature or arcuate configuration of the feeder floor 100, as illustrated in FIG. 8.

The velocity of the curved or arcuate stream 50c is less than the velocity of a projected stream of substantially rectilinear trajectory such as the stream illustrated in FIGS. 1 and 2 in order to engage each of the glass streams at substantially the same distance below the tips of the orificed projections 102. The fluid of the quenching stream may be collected in a trough or receptacle 54c. The receptacle or trough 54c is provided with an outlet pipe 56c for conveying away the fluid or conveying the fluid to a pump (not shown) for circulating the fluid for reuse.

In the arrangements illustrated in FIGS. 1 through 8, the quenching fluid is preferably a liquid such as water. Where the fluid is recirculated for reuse, a dilute acid or alkaline solution may be used. A stream of foam or a stream of carbonated water may also be used as a quenching fluid.

FIG. 9 is a schematic illustration of another arrangement for forming kinks or bends 35d in filaments attenuated from heat-softened material such as glass. In the method performed by the arrangement illustrated in FIG. 9, the attenuated fibers or filaments are vibrated or oscillated and the vibrations or oscillations communicated through the fibers or filaments to the glass streams causing distortions, vibrations or oscillations of the glass streams, the glass streams being quenched or cooled to establish or solidify permanent kinks or bends 35d in the attenuated fibers.

A stream feeder of the character illustrated in FIGS. 1 and 2 has transverse rows of depending orificed projections, one row of such projections 18d being shown in FIG. 9. Glass streams 20d flow from the heat-softened glass contained in the feeder through orifices in the depending projections, each glass stream at the exit region of an orificed projection 18d being in the form of a cone 22d. The glass streams 20d may be attenuated by winding a group or strand of the fibers or filaments into a package as illustrated in FIG. 1, or they may be attenuated through the use of a pull wheel or pull wheels or other conventional means.

Spaced from the projections 18d is a means for exerting forces against the attenuated fibers or filaments for vibrating or oscillating the filaments or fibers, the vibrations or oscillations being transmitted to the glass streams 20d in the form of standing waves in the fibers or filaments under tension which effect successive distortions, oscillations, vibrations or lateral movements of the glass streams 20d. The regions of distortions, oscillations or vibrations of the glass streams 20d are subjected to quenching or cooling to solidify or establish the distortions, vibrations or oscillations in the streams as permanent kinks or bends 35d in the fibers or filaments 24d.

The quenching or cooling of the glass streams of a row is accomplished by impinging a stream of quenching fluid against the glass streams. A tubular member or nozzle construction 106 is connected with a manifold containing a quenching fluid under pressure. In the arrangement illustrated in FIG. 9, the quenching fluid employed may be a gas, such as compressed air. Other suitable gases may be used, such as compressed carbon dioxide, compressed nitrogen or the like, and the air or gases may be at room temperature.

The stream or jet of gas projected from the tube or nozzle 106 quenches or cools the glass of the streams at the regions of the distortions, vibrations or oscillations, the quenching or cooling action of the gas stream solidifying the distortions, oscillations or vibrations of the glass streams as permanent successive kinks or bends in the attenuated fibers or filaments.

The means for exerting forces against the attenuated fibers or filaments to vibrate or oscillate the same comprises a generally cylindrical member 110 mounted on a shaft 111 which is driven or rotated by a motor or other suitable means (not shown). The cylindrical member 110 is provided with multiple return grooves 112 on its exterior peripheral surface region. The filaments 24d are engaged in alternate multiple return grooves, the spiral configuration of the grooves causing successive oscillations or vibrations of the attenuated filaments 24d which are transmitted to the glass streams in the form of standing waves in the fibers or filaments causing successive distortions, oscillations, or vibrations of the glass streams 20d.

The frequency of the vibrations or oscillations may be varied by changing the speed of rotation of the member 110, the frequency of the vibrations or oscillations in a measure determining the spacing or distance between successive kinks or bends formed in the fibers or filaments. Where a gas, such as air, is used for quenching or cooling the glass of the streams, the cooling or quenching effect of a gas is substantially less than the quenching or cooling effect of a quenching liquid.

Hence, the fibers or filaments 24d are attenuated at lower linear speeds than when a quenching liquid is utilized in forming kinks or bends in the fibers or filaments. It is to be understood that a liquid may be projected from the nozzle 106 for quenching the glass of the streams at the region of the distortions, vibrations or oscillations to form kinks or bends in the fibers or filaments. In FIG. 9, the means 110 for vibrating or oscillating the fibers or filaments is illustrated as close to the orificed projections on the glass stream feeder, but it is to be understood that the member 110 may be spaced a greater distance from the stream feeder.

FIG. 10 is a schematic illustration similar to FIG. 9 of a modified arrangement for exerting lateral forces against the attenuated fibers or filaments for vibrating or oscillating the fibers or filaments to cause distortions, vibrations or oscillations of the glass streams to form kinks or bends therein. A stream feeder of the character illustrated in FIGS. 1 and 2 has transverse rows of depending orificed projections, one row of the projections 18e being shown in FIG. 10.

Glass streams 20e flow from a supply of heat-softened glass in the feeder through orifices in the projections 18e, each glass stream at the region adjacent a projection being in the form of a cone 22e. The glass streams 20e may be attenuated to fibers or filaments 24e by winding a group or strand of the fibers or filaments into a package as illustrated in FIG. 1 or by other suitable attenuating means for advancing the fibers or filaments at as substantially uniform rate of speed.

Spaced from the feeder and the orificed projections 18e is another form of means for exerting forces against the fibers or filaments 24e for vibrating or oscillating the filaments or fibers, the vibrations or oscillations being transmitted to the glass streams 20e in the form of standing waves in the fibers or filaments which effect successive distortions, oscillations, vibrations or lateral movements of the glass streams 20e for forming kinks or bends 35e in the fibers or filaments 24e.

The means for exerting forces against the attenuated fibers or filaments comprises an elongated member 115 mounted on a shaft 116 which is connected to a motor (not shown) or other means for rotating the member 115. The member 115 is fashioned with lengthwise arranged flutes or grooves 118 providing ridges or raised portions 120 on its periphery.

The member 115 is disposed with respect to the filaments or fibers 24e so that the filaments or fibers are successively engaged by the ridges or raised portions 120, the ridges setting up oscillations or vibrations of the attenuated fibers or filaments 24e which are transmitted in the form of standing waves in the fibers or filaments to the glass streams causing distortions, oscillations, vibrations or relative lateral movements of the glass streams.

The frequency of the distortion, vibrations, oscillations or lateral movements of the glass streams may be varied or controlled by modifying or changing the frequency of vibrations or oscillations of the filaments or fibers. The frequency of the vibrations or oscillations may be varied by modifying the speed of rotation of the member 115 or by utilizing a member 115 having ridges 120 of different spacing. The frequency of vibrations or oscillations imparted to the fibers or filaments determines in a measure the spacing or distance between successive kinks or bends 35e formed in the fibers or filaments.

The regions of distortions, oscillations or vibrations of the glass streams 20e are subjected to quenching or cooling to form kinks or bends 35e in the fibers or filaments. Arranged in alignment with the row of glass streams 20e is a tubular member or nozzle construction 106e connected with a manifold containing a quenching fluid under pressure.

The quenching fluid may be a gas, such as compressed air, compressed carbon dioxide, nitrogen or the like. A stream or jet of gas projected from the tubular member or nozzle 106e impinges against the glass streams 20e establishing distortions, vibrations or oscillations in the glass streams, the gas quenching or cooling the distortions, oscillations or vibrations of the glass streams as permanent kinks or bends 35e in the attenuated fibers or filaments.

It is to be understood that a liquid quenching medium may be projected from the tubular member 106c, but where the glass streams are distorted, vibrated or oscillated by forces acting against the attenuated fibers or filaments, compressed air or other quenching gas is preferred.

FIG. 11 is illustrative of another form of means for exerting forces against attenuated fibers or filaments to effect distortions, vibrations or oscillations of the glass streams from which the fibers or filaments are attenuated. FIG. 11 illustrates the first of a row of depending projections 18f of a glass stream feeder, such as illustrated at 12 in FIG. 1, each projection having a glass flow passage or orifice 19f.

A glass stream 20f flows through the projection, the glass stream adjacent the end of the projection 18f being in the form of a cone 22f. The glass stream 20f is attenuated into a fiber or filament 24f by winding a linear group or strand of such fibers or filaments into a package as illustrated in FIG. 1 or attenuated by other means.

In the arrangement illustrated in FIG. 11, there is disposed in the path of the advancing fiber or filament 24f a means for exerting lateral forces against the fiber or filament 24f, the means including shaft 124 and 126. Mounted upon the shaft 124 is a blade-like member or vane 125, and mounted upon the shaft 126 is a blade-like member or vane 127. The shafts 124 and 126 are simultaneously driven in synchronism by a motor (not shown) or other suitable means.

The vanes 125 and 127 function as force exerting or impulse members and are arranged ninety degrees out-of-phase whereby during rotation of the members, the edge surfaces 130 of the members successively engage and impart forces or transverse impulses at high frequency to the fiber or filament 24f or group of fibers or filaments to set up or establish and maintain a series of standing waves in the fiber or filament 24f or linear group or strand of fibers or filaments.

The oscillations of vibrations of the fiber or filament 24f are transmitted by the series of standing waves to the glass stream 20f at the tip region of the cone 22f causing distortions, vibrations, oscillations or lateral movements of the glass stream 20f at the region of attenuation.

The distortions, oscillations, vibrations or movements of the glass stream 20f and the other glass streams of the row of streams are subjected to quenching or cooling to solidify or establish the distortions, vibrations, oscillations or relative movements in the streams as permanent kinks or bends 35f in the fibers or filaments. A tubular member or nozzle construction 106f is connected with a manifold (not shown) containing a quenching fluid under pressure. In the arrangement illustrated in FIG. 11 the quenching fluid is preferably a gas, such as compressed air, compressed carbon dioxide, compressed nitrogen or the like.

A stream or jet of air or other gas is projected from the tube or nozzle 106f and quenches or cools the glass of the streams 20f at the regions of the distortions, vibrations, oscillations or lateral movements, the quenching or cooling action of the glass solidifying the distortions, vibrations, oscillations or movements of the glass streams as permanent kinks or bends 35f in the attenuated fiber or filaments 24f and in the fibers or filaments attenuated from other streams impinged by the jet or stream of gas from the nozzle 106f.

In the use of the arrangement shown in FIG. 11, the number of kinks or bends 35f per unit of length of the fiber or filament 24f is dependent upon the frequency of the forces or impulses imparted to the attenuated fiber or filament by the rotating members or vanes 125 and 127. By varying the frequency of the forces or impulses of the members or vanes 125 and 127 against the attenuated fiber or filament, the space or distance between successive kinks or bends 35f may be varied and controlled. Thus, if the frequency of the forces or impulses against the fiber or filaments 24f is reduced, the spacing between adjacent kinks or bends is lengthend. It is to be understood that a quenching liquid may be used for quenching the glass stream to form the kinks or bends 35f in the attenuated fiber or filament 24f.

FIG. 12 is illustrative of another form of means exerting transverse forces against an attenuated fiber or filament to effect distortions, vibrations, oscillations or relative lateral movements of the glass stream from which the fiber or filament is attenuated. FIG. 12 illustrates the first of a row of depending projections 18g of a glass stream feeder, such as the feeder illustrated at 12 in FIG. 1, the projection having a glass flow passage or orifice 19g.

A glass stream 20g flows through the orificed projection, the glass stream adjacent the end of the projection 18g being in the form of a cone 22g. The glass stream 20g is attenuated into a fiber or filament 24g by winding a linear group or strand of the filaments into a package as illustrated in FIG. 1, or the streams attenuated by a pull wheel arrangement or other means.

In the arrangement illustrated in FIG. 12, there is disposed below and spaced from the depending projection 18g a strip-like member 134 having a substantially planar portion 135 and a circular partial loop portion 136. The fiber or filament 24g with other fibers or filaments from the streams of the row are converged into a linear group or strand in advance of the member 134 and the linear group or strand advanced preferably through the central region of the circular loop portion 136. Disposed adjacent the planar portion 135 of the member 134 is a tubular member or nozzle construction 138.

A stream or jet of compressed air or other gas is projected from the tubular member or nozzle 138 in substantial parallelism with and along the planar portion 135 into the loop portion 136. It is found that the action of the air stream within the loop portion 136 is to vibrate or oscillate the attenuated fiber or filament 24g setting up or establishing and maintaining a series of standing waves in the filament 24g or linear group or strand of fibers or filaments. The oscillations or vibrations of the filaments 24g are transmitted by the standing waves to the glass stream 20g at the tip region of the cone 22g causing distortions, vibrations, oscillations or lateral movements of the glass stream 20g.

The distortions, oscillations, vibrations or lateral movements of the glass stream 20g and of the other glass streams of the row of streams are subjected to quenching or cooling to solidify or establish the distortions, vibrations, oscillations or lateral movements in the streams as permanent kinks or bends 35g in the fibers or filaments. A tubular member or nozzle construction 106g is connected with a manifold (not shown) containing a quenching fluid under pressure. In the arrangement illustrated in FIG. 12, the quenching fluid is preferably a gas, such as compressed air, compressed carbon dioxide, compressed nitrogen or the like.

A stream or jet of air or other gas is projected from the tube or nozzle 106g and quenches or cools the glass of the streams 20g at the regions of the distortions, vibrations, oscillations or lateral movements, the quenching or cooling action of the gas solidifying the distortions, vibrations, oscillations or lateral movements of the glass streams as permanent kinks or bends 35g in the attenuated fiber or filament 24g and in the fibers or filaments attenuated from other streams impinged by the stream of gas from the nozzle 106g.

By varying the velocity of the air stream projected from the nozzle 138, the frequency of vibration or oscillation of the fiber or filament 24g may be controlled to vary the spacing between adjacent kinks or bends 35g.

FIGS. 13 through 15 illustrate an arrangement for processing streams of heat-softened material, such as glass, to form kinky fibers or filaments wherein the glass streams are flowed through orifices in a planar floor section of a glass stream feeder without depending projections. The arrangement includes a stream feeder 140 containing a supply 142 of glass. The ends of the feeder are provided with terminal lugs 144, one of which is shown in FIGS. 13 and 14, the lugs adapted to be connected with electric current supply conductors (not shown) for heating the glass to maintain the glass at a viscosity at which streams of glass may be flowed from the feeder.

As particularly shown in FIG. 15, the feeder floor section 146 is of planar shape and is provided with transverse rows of orifices or passages 148. Streams 20h of glass are flowed through the orifices or openings 148, the regions of the glass streams adjacent the orifices being in the form of cones 22h.

The streams 20h of glass are attenuated to fibers or filaments 24h by converging the fibers or filaments into a linear group or strand 28h by a gathering shoe or member 26h and the strand or group wound into a package 30h on a collector tube 32h mounted on a rotating mandrel 33h of a conventional winder. A rotating transverse means 36h mounted on a reciprocable bar 38h may be used to effect a crossing of the individual convolutions of strand on the package, reciprocation of the bar 38h distributing the strand lengthwise of the package.

The arrangement for distorting, vibrating or oscillating the glass streams and quenching the glass streams is similar to the arrangement shown in FIGS. 1 and 2. Disposed lengthwise of the glass stream feeder 140 is a manifold 40h supplied with a quenching fluid, such as water under pressure. Speed lengthwise of the manifold and joined thereto are tubes, pipes or tubular nozzles 44h, each pipe 44h being aligned with a transverse row of glass streams 20h.

The water or quenching fluid under pressure in the manifold 40h is projected from the nozzles 48h as quenching streams 50h. The streams 50h impinge against the glass streams 20h adjacent the tips of the cones 22h of each row of glass streams, the forces of quenching streams 50h distorting, oscillating or vibrating the glass streams 20h adjacent the tip regions of the cone 22h. The streams 50h quench or cool the distortions, vibrations or oscillations forming successive permanent kinks or bends 35 in the fibers or filaments 24h.

A receptacle or trough 54h is disposed to receive and convey away the quenching fluid after the fluid has engaged the glass streams, the receptacle 54h having an outlet pipe 56h. The outlet pipe 56h may convey the fluid away as waste or the pipe 56h may be connected to a pump (not shown) for recirculating the fluid through the manifold 40h for reuse in the quenching operation. The operation of the arrangement shown in FIGS. 13 through 15 is substantially the same as the operation of the arrangement illustrated in FIG. 1 in forming kinky fibers or filaments.

Figure 17:
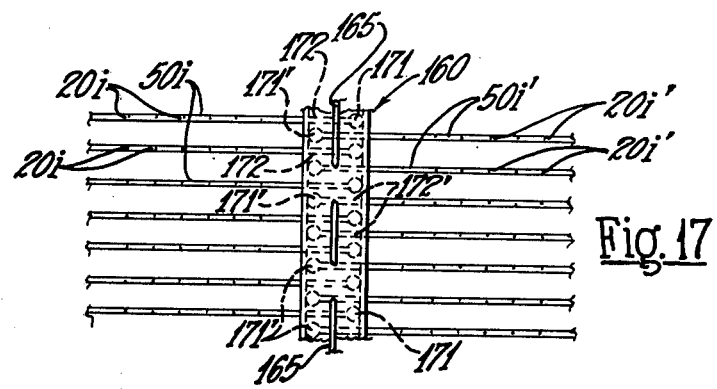
FIG. 17 is a plan view taken on the line 17—17 of FIG. 16.

FIGS. 16 and 17 illustrate another arrangement for processing glass streams to form kinks or bends 35i in attenuated fibers or filaments 24i, the arrangement being particularly usable for concomitantly quenching a large number of glass streams. The arrangement includes a glass stream feeder 152 of substantial width having rows of orificed projections providing a large number of glass streams.

The floor section 154 of the stream feeder at each side of the longitudinal central region is fashioned with transverse rows of depending projections, the projections of the rows at the left side of the central region, as viewed in FIG. 16, being designated 156, the projections of the rows at the right side of the central region of the feeder being designated 156'. The projections are fashioned with stream flow passageways or orifices through which flow streams of glass from heat-softened glass contained in the stream feeder 152.

The glass streams flowing from the orificed projections at the left side of the central region of the feeder are designated 20i, and the glass streams flowing from the orificed projections at the right side of the central region of the feeder are designated 20i', the fibers or filaments formed from the streams 20i being designated 24i and the fibers or filaments formed from the stream 20i' being designated 24i'. The glass streams are attenuated to fibers or filaments 24i and 24i' by winding a linear group or strand of the fibers or filaments into a package on a winder in the manner illustrated in FIG. 1.

The cones of glass at the tips of the projections at the left side of the central region of the feeder are designated 22i and the cones of glass at the tips of the projections at the right side of the central region of the feeder being designated 22i'. As shown in FIG. 17, the transverse rows of glass streams 20i flowing from the stream feeder are in staggered relation with the rows of glass streams 20i' flowing from the feeder at the right side of the central region.

Disposed lengthwise of the glass stream feeder 152 and below the central region of the feeder is a manifold 160 having an interior chamber or channel 161 adapted to contain a quenching fluid, such as water under pressure. Disposed between an upper surface 163 of the manifold and the lower surface of the floor section 154 of the feeder is a plurality of lengthwise spaced struts or supports 165 engaging the floor section to prevent warpage and sagging of the feeder floor. The supports 165 are maintained at a safe operating temperature through contact with the manifold 160 whch is cooled by the circulation of quenching fluid through the manifold.

The manifold 160 is constructed to provide for the projection of streams or jets of quenching fluid to impinge against the glass streams 20i and 20i'. The quenching streams 50i projected from the left side of the manifold 160 impinge the glass streams 20i, and the quenching streams 50i' projected from the right side of the manifold 160 impinge the glass streams 20i' as illustrated in FIG. 17.

The manifold 160 is interiorly configurated to provide for the projection of quenching streams from both sides of the manifold. The chamber or channel 161 extending full length of the manifold has an upper surface 167 which is the lower surface of a portion 169 extending full length of the manifold. At each of the regions for delivering the quenching streams 50i, the roof of the channel 161 is fashioned with upwardly extending channels 171. As shown in FIGS. 16 and 17, each of the upwardly extending channels 171 is in communication with a horizontal channel or passage 172 provided in the portion 169 of the manifold 160.

One of the vertical channels 171 and the horizontal passage or channel 172 in communication therewith are shown in the cross section of the manifold 160 in FIG. 16. Thus, the quenching fluid in the channel or chamber 161 flows upwardly through the channels 171 thence through the horizontal passages 172 from which coherent quenching streams 50i are projected into impingement with the glass streams 20i. The quenching fluid in the channel 161 flows upwardly through vertical channels 171' thence horizontally through passages 172' from which coherent quenching streams 50i' are projected and impinged against the glass streams 20i'.

Through this arrangement a single central manifold 160 provides streams of quenching fluid projected from both sides of the manifold to impinge against all of the glass streams at each side of the manifold. As shown in FIG. 16, there is provided trough-like receptacles 54i and 54i' to receive the quenching liquid after its engagement with the glass streams. Each of the trough-like receptacles is provided with an outlet pipe 56i for conveying away the fluid in the receptacles. If desired, the pipes 56' may be connected with a pump (not shown) to recirculate the quenching fluid through the manifold passage 161 for reuse in quenching the glass streams.

Figure 18:
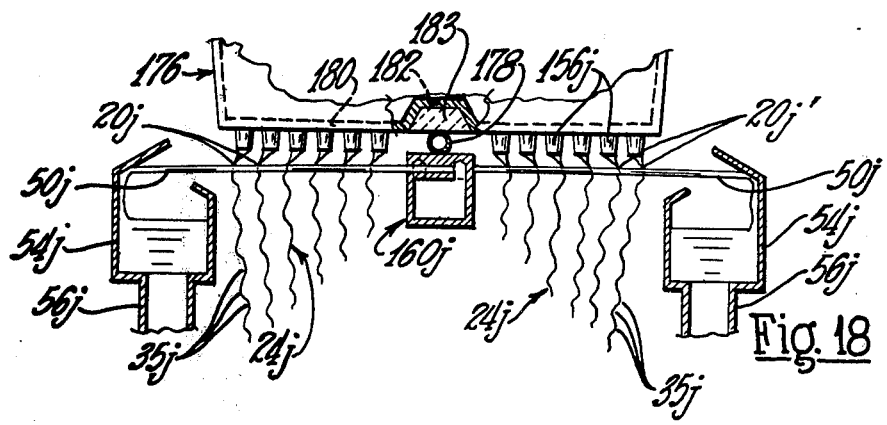
FIG. 18 illustrates a modified form of the arrangement shown in FIG. 16.

FIG. 18 illustrates an arrangement similar to that shown in FIG. 16 but incorporating a modified arrangement for preventing warpage and sagging of the floor section of the stream feeder. The stream feeder 176 is similar to the stream feeder 172, having depending orificed projections 156j through which flow streams 20j and 20j' of glass for attenuation to fibers or filaments having kinks or bends 35j. The manifold 160j and the trough-like receptacles 54j are of the same construction as the manifold and trough-like receptacles shown in FIG. 16.

The means for supporting the central region of the stream feeder 176 is inclusive of a tubular means or tube 178 extending lengthwise of and mounted by the manifold 160j. The longitudinal central region of the floor section 180 of the feeder 176 is fashioned with a raised portion 182 providing a longitudinal recess in which is disposed a high temperature resistant refractory 183. The tubular member 178 engages the refractory 183 providing support for the central region of the glass stream feeder or bushing 176.

Water or other heat-absorbing fluid is circulated through the tube 178 to maintain the tube at a safe operating temperature. The circulating water in the tube 178 conveys away excess heat developed adjacent the raised portion 182 in order to prevent excessive rise in temperature in the molten glass at the lengthwise central region of the stream feeder where there are no orificed projections.

The troughs 54j are provided with outlet pipes 56j for conveying away the fluid of the quenching streams, or conveying the fluid to a pump (not shown) for recirculating the fluid through the manifold 160j for reuse in quenching the glass streams. The arrangement shown in FIG. 18 performs the method of distorting, vibrating or oscillating the glass streams by the forces of the quenching streams 50j and quenching the streams to form kinks or bends 35j in the attenuated fibers or filaments 24j.

FIGS. 19 through 21 illustrate an apparatus for forming curly fibers or filaments from glass streams comprised of dual glasses and distorting and quenching the bi-glass streams to form successive kinks or bends in the curly fibers. The apparatus for forming glass streams comprising two glasses having different coefficients of expansion is of the general character shown in the U.S. Pat. No. 3,259,479 to Tiede.

With particular reference to FIGS. 19 and 20, the arrangement includes a stream feeder 186 in which two glasses having different coefficients of expansion are separated from each other by a partition of divider 188 extending longitudinally and centrally of the feeder. The feeder 186 has a floor or floor section 190, the floor section having transverse rows of depending projections 192 each having an orifice or passage 194. The transverse rows of orifices 194 of the projections are illustrated in FIG. 20.

The feeder contains partitions or baffles so that each glass extending through the lengthwise half of the feeder has access to the full width of the feeder in alternate zones along the length of the feeder. The baffling is provided by a series of crosswise partitions 198 spaced from each other a distance equal to the space along the length of the feeder between crosswise rows of the orifices 194. As shown in FIG. 20, the partitions 198 extend across the full width of the interior of the feeder between the longitudinal side walls 200, each of the partitions 198 being disposed to bisect a row of orifices or flow passages 194 in the floor section and depending projections 192.

The lengthwise partition 188 extends from the upper portion of the feeder downwardly to the horizontally disposed flow blocking portions or bridges 202 joining the transverse partitions 198 and extending transversely from the front side wall 200 to the lengthwise arranged divider 188, while horizontally disposed flow blocking portions or bridges 204 between alternate pairs of partitions 198 extend from the rear side wall 200 to the divider 188.

Such construction maintains the two glasses separated on the opposite sides of the partition 188 but with access to each row of orifices in the projections, the alternate zones provided by the transverse partitions 198 providing paths for the emergence of the respective glass through two adjacent rows of half orifices which are bisected by partitions 198. One mass of glass having a particular coefficient of expansion is indicated at 208, and the other mass of glass of different coefficient of expansion being indicated at 210 in FIG. 19.

The orificed projections 192 and orifices 194 provide abutting paths of flow for the two glasses. FIG. 21 illustrates in isometric the partition 198 bisecting an orifice 194. The different glasses 208 and 210 forming the bi-glass streams 214 from both sides of the partitioning walls 198 are combined within the flow passage in the depending projections 192.

Attenuation of the bi-glass streams to fibers or filaments 216 results in curly fibers or filaments by reason of the difference in coefficient of expansion of the two glasses making up the bi-glass streams. The bi-glass streams formed by the apparatus illusrrated in FIGS. 19 and 20 may be distorted, oscillated or vibrated at the regions adjacent the tips of the cones of glass formed at the exit regions of the depending projections 192 and cooled or quenched to establish kinks or bends in the curly fibers or filaments.

With reference to FIG. 19, tubular members, pipes or nozzles 48k are arranged so that each nozzle 48k is aligned with a transverse row of bi-glass streams 214. The tubular members or nozzles 48k are connected with a manifold, such as the manifold 40 shown in FIG. 1, containing quenching fluid, such as water. Streams of quenching fluid projected from the tubular members or nozzles 48k are impinged against the bi-glass streams 214, distorting, vibrating or oscillating the glass of the streams adjacent the tips of the cones of the glass streams.

The quenching fluid quenches or cools the distorted, vibrated or oscillated regions of the glass streams establishing successive permanent kinks or bends 35k in the bi-glass filaments or fibers 216. The streams are attenuated to fibers or filaments by winding a linear group or strand of the fibers or filaments into a package on a winding machine as hereinbefore described or by other suitable attenuating means. The attenuation of the bi-glass streams without being distorted or quenched results in a curly fiber or filament.

FIG. 24 illustrates an attenuated curly fiber or filament 216 having successive kinks or bends 35k. A mass of fibers or filaments of the character illustrated in FIG. 24 and produced in accordance with the method performed by the apparatus shown in FIGS. 19 and 20 provide high resiliency characteristics which are advantageous in many end uses for the curly and kinky fibers or filaments 216.

FIG. 22 illustrates an orificed projection 192 depending from a feeder floor 190, the latter having an orifice 194 which registers with the passage in the projection 192. In this form, a partition 220, similar to the partition 198 shown in FIG. 21, is fashioned with a depending portion 221 extending downwardly into the passage in the depending projection 192. In this form the passage in each depending projection 192 is bisected for its full length by the partition portion 221. The two glasses flowing into the orifice 194 and the passage in the depending projection do not make contact with each other to form a bi-glass stream until they emerge from the passage in a depending projection 192.

FIG. 23 illustrates a modification for forming a bi-glass stream. In this form the floor section 224 of a stream feeder is provided with stream flow orifices of the character illustrated at 225. Disposed so as to bisect each glass stream flow orifice 225 is a partition 227, the lower edge of the partition being engaged with the feeder floor 224. In this form the different glasses separated by the partition 227 are joined into bi-glass streams as the glasses enter the orifices 225 in the floor section 224 of the feeder.

The bi-glass streams formed by the arrangement shown in FIG. 22, or formed by the arrangement shown in FIG. 23, may be distorted and the streams quenched in the manner herebefore described to form curly fibers with successive kinks or bends 35k illustrated in FIG. 24.

The method and arrangement of the invention may be utilized to form permanent kinks or bends in a wide range of diameters of attenuated fibers or filaments. The fibers or filaments formed with kinks or bends may be of small diameters of about thirteen hundred thousandths of an inch to about fifty hundred thousandths of an inch for textile and the like uses, or the attenuated fibers or filaments processed with kinks or bends may be of diameters upwards of five thousandths of an inch or more depending upon the end use for larger fibers or filaments such as for reinforcements for other materials.

Tests have been made using fiber-forming resinous materials, such as polypropylene, subjecting streams of the material to a stream of quenching fluid, such as water, during attenuation of the material to fibers or filaments and successive kinks or bends formed in the resinous fibers or filaments.

It is apparent that, within the scope of the invention, modifications and different arrangements may be made other than as herein disclosed, and the present disclosure is illustrative merely, the invention comprehending all variations thereof.

I claim:

1. The method of forming continuous fibers of heat-softened glass including flowing streams of the glass from a feeder, the regions of the streams adjacent the feeder being cone-shaped, attenuating the streams to continuous fibers, engaging the attenuated continuous fibers with a rotating body, oscillating the attenuated continuous fibers by the rotating body whereby the oscillations effect successive distortions of the tips of the cones of glass, and impinging a stream of liquid against the distortions of the glass streams for reducing the temperature of the glass streams at the distortions at a rate sufficient to form successive permanent bends in the attenuated continuous fibers.

2. The method of forming continuous fibers of heat-softened glass including flowing streams of the glass from a feeder, the regions of the streams adjacent the feeder being cone-shaped, attenuating the streams to continuous fibers, engaging the attenuated continuous fibers with a rotating body. oscillating the attenuated continuous fibers by the rotating body whereby the oscillations effect successive distortions of the tips of the cones of glass, and impinging a jet of liquid against the glass streams at the distortions to reduce the temperature of the streams sufficiently to form successive permanent bends in the attenuated continuous fibers.

3. Apparatus for forming continuous glass fibers, in combination, a feeder for flowing streams of heat-softened glass wherein the regions of the streams adjacent the feeder are cone-shaped, means attenuating the streams of glass to fibers, means for oscillating the fibers including a pair of rotatable shafts, a fiber-engaging member mounted upon each of the shafts, said members being out-of-phase whereby the rotating members successively engage the fibers for oscillating the fibers whereby the oscillations effect distortions of the tips of the cones of the glass streams, and means for directing a stream of fluid against the tips of the cones for reducing the temperature of the distorted regions to form permanent bends in the fibers.

4. The method of forming continuous fibers of heat-softened glass including flowing streams of the glass from a feeder, the regions of the streams adjacent the feeder being cone-shaped, attenuating the streams to continuous fibers, engaging the attenuated continuous fibers by an oscillator, activating the oscillator at a frequency whereby the oscillations effect successive distortions of the tips of the cones of glass, and impinging a stream of liquid against the distortions of the glass streams for reducing the temperature of the glass streams at the distortions at a rate sufficient to form successive permanent bends in the attenuated continuous fibers.

5. Apparatus for forming continuous glass fibers, in combination, a feeder for flowing streams of heat-softened glass wherein the regions of the streams adjacent the feeder are cone-shaped, means attenuating the streams of glass to continuous fibers, an oscillator including a relatively movable member engageable with the attenuated fibers for oscillating the attenuated fibers whereby the oscillations effect successive distortions of the tips of the cones of the glass streams, and means directing a stream of liquid against the tips of the cones of the glass streams for cooling the distortions as permanent bends in the attenuated fibers.

6. The method of continuous fibers from heat-softened glass including flowing streams of glass from a feeder, the regions of the streams adjacent the feeder being cone-shaped, attenuating the streams to continuous fibers, engaging the attenuated continuous fibers with a vibrator, vibrating the fibers by the vibrator at a frequency whereby the vibrations effect successive distortions of the tips of the cones of glass, and impinging a stream of liquid against the glass streams at the distortions for cooling the streams at the tips of the cones to form permanent successive bends in the attenuated fibers.

7. The apparatus according to claim 5 wherein the movable member is rotatable about an axis.

8. The method of forming continuous fibers of heat-softened glass including flowing streams of the glass from a feeder, the regions of the streams adjacent the feeder being cone-shaped, attenuating the streams to continuous fibers, engaging a rotating member with the attenuated continuous fibers, vibrating the attenuated fibers by the rotating member whereby the vibrations effect successive distortions of the tips of the cones of glass, and impinging a stream of liquid against the distorted tips of the cones of glass to thereby reduce the temperature of the streams of glass at the tips of the cones at a rate sufficient to form successive permanent bends in the attenuated continuous fibers.

9. The method of forming curly and kinky continuous fibers of two heat-softened glasses having different coefficients of expansion including flowing the glasses into contact with each other in each of a plurality of stream flow orifices of a stream feeder, each of the glass streams being comprised of both glasses in adhered to side-by-side relation, the regions of the glass streams adjacent the feeder being cone-shaped, attenuating the glass streams to continuous fibers, impinging a coherent stream of liquid against the tips of the cones of glass to effect successive distortions of the tips of the cones of the glass streams, and reducing the temperature of the glass streams at the distortions by the stream of liquid at a rate sufficient to form the continuous fibers with permanent curly configurations and with successive permanent kinks.

10. The apparatus according to claim 7 wherein the rotatable member has multiple return grooves accommodating the attenuated fibers for oscillating the fibers.

11. Apparatus for forming continuous glass fibers, in combination, a feeder for flowing streams of heat-softened glass wherein the regions of the streams adjacent the feeder are cone-shaped, means attenuating the streams of glass to continuous fibers, means including a rotatable member engaging the attenuated continuous fibers for oscillating the attenuated continuous fibers whereby the oscillations effect successive distortions of the tips of the cones of the glass streams, and means directing a stream liquid against the tips of the cones for cooling the distortions as permanent bends in the attenuated fibers.

12. Apparatus for forming continuous glass fibers, in combination, a feeder for flowing streams of heat-softened glass wherein the regions of the streams adjacent the feeder are cone-shaped, means attenuating the streams of glass to fibers, a member in encircling relation with the attenuated fibers, a nozzle disposed adjacent the member, said nozzle being arranged to direct a jet of gas into the encircling region of the member for oscillating the fibers whereby the oscillations effect distortions of the tips of the cones of the glass streams, and means for directing a stream of liquid against the distortions whereby the distortions are solidified as permanent bends in the attenuated fibers.

13. The apparatus according to claim 7 wherein the periphery of the rotatable member has circumferentially-spaced ridges for engagement with the fibers for oscillating the fibers.

* * * * *